United States Patent
Huang et al.

(10) Patent No.: US 10,769,836 B2
(45) Date of Patent: Sep. 8, 2020

(54) METHOD AND APPARATUS FOR ESTABLISHING COORDINATE SYSTEM AND DATA STRUCTURE PRODUCT

(71) Applicant: Industrial Technology Research Institute, Hsinchu (TW)

(72) Inventors: Po-Yu Huang, Yunlin County (TW); Xin-Lan Liao, Taichung (TW); Wei-Liang Wu, Taichung (TW); Lih-Guong Jang, Hsinchu (TW); Kun-Hsien Lin, Taichung (TW); Yi-Yuan Chen, Taoyuan (TW)

(73) Assignee: Industrial Technology Research Institute, Hsinchu (TW)

(*) Notice: Subject to any disclaimer, the term of this patent is extended or adjusted under 35 U.S.C. 154(b) by 0 days.

(21) Appl. No.: 15/854,830

(22) Filed: Dec. 27, 2017

(65) Prior Publication Data
US 2019/0197759 A1    Jun. 27, 2019

(51) Int. Cl.
G06T 15/00    (2011.01)
G01C 21/20    (2006.01)
G01S 5/16    (2006.01)

(52) U.S. Cl.
CPC .......... *G06T 15/005* (2013.01); *G01C 21/206* (2013.01); *G01S 5/16* (2013.01); *G06T 2210/04* (2013.01)

(58) Field of Classification Search
CPC .................................................. G06T 15/005
(Continued)

(56) References Cited

U.S. PATENT DOCUMENTS 8,326,526 B2    12/2012    Won et al.
9,644,973 B2    5/2017    James
(Continued)

FOREIGN PATENT DOCUMENTS

CN    105137390    12/2015
CN    105425210    3/2016
(Continued)

OTHER PUBLICATIONS

Lih-Guong Jang et al., "System and Method for Optical Communication, Transmitting Device and Receiving Device," Unpublished Taiwan application No. 106126391, Filed on Aug. 4, 2017.
(Continued)

*Primary Examiner* — Hai Tao Sun
(74) *Attorney, Agent, or Firm* — JCIPRNET

(57) ABSTRACT

A method and an apparatus for establishing a coordinate system and a data structure product are provided. The method includes following steps: obtaining at least one layer related to an arrangement of an indoor space to generate a layout pattern in a 2D or 3D model; obtaining locations of positioning devices located within the indoor space and labelling the locations in the layout pattern; dividing the layout pattern into multiple view tiles according to a unit area or a unit volume for displaying the layout pattern; dividing a portion of the layout pattern around the labelled positioning devices into multiple positioning tiles according to the labelled locations of the positioning devices; and selecting at least one representative point of the view tiles and the positioning tiles as a reference point to define a reference frame and establishing the coordinate system based on the reference frame.

14 Claims, 8 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2008/0239425 A1 | 10/2008 | Yoshida | |
| 2011/0157220 A1* | 6/2011 | Kim | G09B 11/00 345/619 |
| 2013/0122941 A1 | 5/2013 | Das et al. | |
| 2013/0157628 A1* | 6/2013 | Kim | A01K 15/023 455/414.1 |
| 2013/0207980 A1* | 8/2013 | Ankisettipalli | G06T 11/206 345/440 |
| 2014/0200027 A1 | 7/2014 | Kim et al. | |
| 2014/0257687 A1* | 9/2014 | Chen | G01C 21/3682 701/426 |
| 2015/0036016 A1 | 2/2015 | Jovicic | |
| 2015/0153160 A1* | 6/2015 | James | G01C 21/206 356/51 |
| 2015/0289111 A1* | 10/2015 | Ozkan | H04W 4/40 455/456.1 |
| 2016/0029178 A1* | 1/2016 | Schatzberg | H04W 64/00 455/456.1 |
| 2016/0071294 A1 | 3/2016 | Park et al. | |
| 2016/0315702 A1 | 10/2016 | Roberts et al. | |

FOREIGN PATENT DOCUMENTS

| | | |
|---|---|---|
| CN | 105674986 | 6/2016 |
| CN | 105827311 | 8/2016 |
| CN | 106462265 | 2/2017 |
| KR | 20140128679 | 11/2014 |
| TW | 201121313 | 6/2011 |
| TW | 201211573 | 3/2012 |
| TW | 201328431 | 7/2013 |
| TW | I497462 | 8/2015 |

OTHER PUBLICATIONS

Piotr Mirowski, et al., "SignalSLAM: Simultaneous Localization and Mapping with Mixed WiFi, Bluetooth, LTE and Magnetic Signals," 2013 International Conference on Indoor Positioning and Indoor Navigation, Oct. 28-31, 2013, pp. 1-10.

Mu Zhou, et al., "Hotspot Ranking Based Indoor Mapping and Mobility Analysis Using Crowdsourced Wi-Fi Signal" IEEE Access, vol. 5, Mar. 3, 2017, pp. 3594-3602.

Xiaolei Zhou, et al., "MagSpider: A Localization-free Approach for Constructing Global Indoor Map for Navigation Purpose," Proceedings of the ACM Turing 50th Celebration Conference—China, Article No. 44, May 12-14, 2017, pp. 1-10.

Chengwen Luo, et al., "From mapping to indoor semantic queries: Enabling zero-effort indoor environmental sensing," Journal of Network and Computer Applications, vol. 80, Issue C, Feb. 2017, pp. 141-151.

Chunbo Luo, et al., "A Communication Model to Decouple the Path Planning and Connectivity Optimization and Support Cooperative Sensing," IEEE Transactions on Vehicular Technology, vol. 63, No. 8, Oct. 2014, pp. 3985-3997.

Office Action of Taiwan Counterpart Application, dated Aug. 10, 2018, pp. 1-7.

* cited by examiner

METHOD AND APPARATUS FOR ESTABLISHING COORDINATE SYSTEM AND DATA STRUCTURE PRODUCT

TECHNICAL FIELD

The disclosure relates to a method and an apparatus for positioning and more particularly, to a method and an apparatus for establishing a coordinate system.

BACKGROUND

Most of current indoor positioning techniques use Wi-Fi, Bluetooth and the magnetic field of the earth for positioning. When an indoor positioning system is deployed, location fingerprints (which are measured with received signal strength indicators (RSSIs)) are required to be collected and processed at each sampling point for off-line training, a detection device is held and moved within a positioning area for on-line calibration to complete a signal map with the use of a learning algorithm, and then the signal map is compiled into an indoor map so as to synchronize with the indoor map.

However, the above described method not only has complicated prearrangement and data update processes, but also results in difficulty in accurately predicting a coverage of positioning devices due to signal blocking cause by building construction and interior arrangement. Moreover, changes of the positioning devices cannot be perceived, and even though locations of the positioning devices (wireless communication devices) are acquired in advance, it is difficult to establish a coordinate system to standardize reference frames of the indoor map.

SUMMARY

According to another one of the embodiments of the present disclosure, there is provided a method for establishing a coordinate system of a coordinate system of an indoor space by an electronic apparatus. The method includes: obtaining at least one layer related to an arrangement of the indoor space to generate a layout pattern in a two-dimensional (2D) or a three-dimensional (3D) model; obtaining locations of a plurality of positioning devices located within the indoor space and labelling the locations in the layout pattern; dividing the layout pattern into multiple view tiles according to a unit area or a unit volume for displaying the layout pattern; dividing a portion of the layout pattern around the positioning devices into multiple positioning tiles according to the labelled location of each of the positioning devices; and selecting at least one representative point of the view tiles and the positioning tiles as reference points to define a reference frame and establishing the coordinate system based on the reference frame.

According to another one of the embodiments of the present disclosure, there is provided an apparatus for establishing a coordinate system, which includes a data retrieving unit, a storage unit and a processor. The storage unit is configured to store data retrieved by the data retrieving unit and a plurality of computer commands or programs. The processor is coupled to the data retrieving unit and the storage unit and configured to execute the computer commands or programs to perform steps of: obtaining, by the data retrieving unit or the storage unit, at least one layer related to an arrangement of an indoor space to generate a layout pattern in a 2D or 3D model; obtaining, by the data retrieving unit, locations of a plurality of positioning devices located within the indoor space and labelling the locations in the layout pattern; dividing the layout pattern into multiple view tiles according to a unit area or a unit volume for displaying the layout pattern; dividing a portion of the layout pattern around the positioning devices into multiple positioning tiles according to the labelled location of each of the positioning devices; and selecting at least one representative point of the view tiles and the positioning tiles as a reference point to define a reference frame and establishing the coordinate system based on the reference frame.

According to another one of the embodiments of the present disclosure, there is provided a data structure product providing a data structure of information required for an electronic map or an indoor positioning service. The data structure product includes a data structure and an execution module. The data structure includes a first field storing an ID number of one of a plurality of tiles divided from an indoor space, wherein the tiles includes view tiles and positioning tiles; a second field storing a type of the one of the tiles; a third field storing a mark indicating whether at least one representative point of the one of the tiles is a reference point; and a fourth field storing information related to the one of the tiles, wherein the information includes at least one of a hierarchical relationship of the data structure, an attribute of the tile or object description. The view tiles are obtained by dividing a layout pattern according to a unit area or a unit volume for displaying the layout pattern generated by at least one layer related to an arrangement of the indoor space. The positioning tiles are obtained by dividing a portion of the layout pattern around a plurality of positioning devices according to a location of each of the positioning devices labelled in the layout pattern. The execution module accesses the data structure through a processor and determines and outputs the view tiles near the location according to contents of the fields corresponding to the location.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
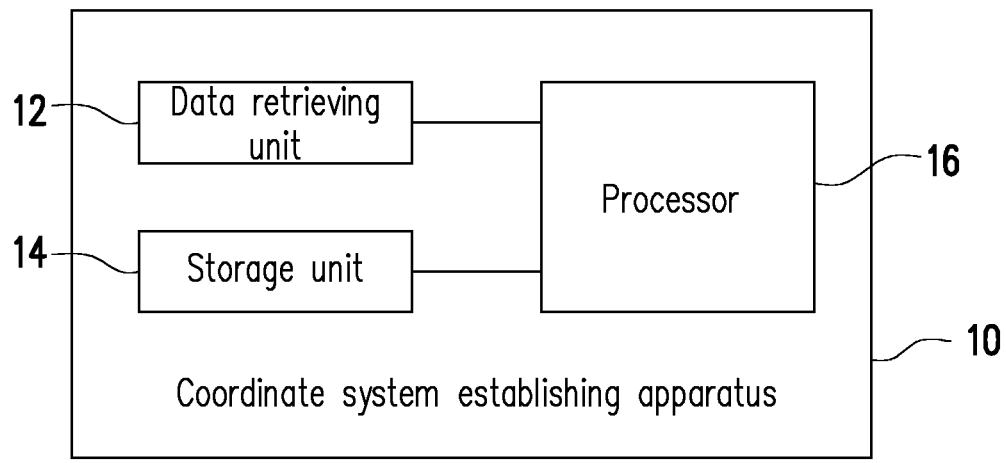
FIG. 1 is a block diagram illustrating an apparatus for establishing a coordinate system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

The disclosure defines a reference frame and establishes a coordinate system of an indoor space by adopting an indoor positioning technique based on optical communication, which employs light sources of visible light communication as positioning devices, and dividing tiles according to the unit area or unit volume for displaying the layout pattern and clustering algorithms.

FIG. 1 is a block diagram illustrating an apparatus for establishing a coordinate system according to an embodiment of the disclosure. With reference to FIG. 1, a coordinate system establishing apparatus 10 is an electronic apparatus with computation capability, such as a server, a workstation or a computer cluster. The coordinate system establishing apparatus 10 includes, for example, a data retrieving unit 12, a storage unit 14 and a processor 16 of which functions are described as below.

In an embodiment, the coordinate system establishing apparatus 10 provides an editing interface by the processor 16 executing computer commands or programs. The editing interface is, for example, a drawing software, a computer aided design software or a plugin, which is capable of visually displaying an arrangement of an indoor space, locations of labelled positioning devices and objects related to the indoor space and provides users with a method for editing display effects or information related of the objects. The objects include a layout pattern, a positioning device and a geometry object such as a point, a line, a plane, or a body, and the information includes, but is not limited to, a hierarchical relationship of a data structure such as an identification (ID) of a father node or a child node, an attribute of a view tile such as a floor or a zoom level, or object description such as a geometric expression of point, line, plane, or body, a coordinate, or an attribute of the object.

The data retrieving unit 12 is, for example, an interface device such as a universal serial bus (USB) interface, a Firewire interface, a Thunderbolt interface or a card reader interface capable of being connected with an external device such as a flash drive, a portable hard disk or a memory card for retrieving data. In another embodiment, the data retrieving unit 12 may be, for example, an input tool such as a keyboard, a mouse, a touch panel or a touch screen employed for detecting an input operation of the user to retrieve input data. In yet another embodiment, the data retrieving unit 12 may be, for example, a network card supporting a wired network connection such as Ethernet or a wireless network card supporting a wireless communication standard such as institute of electrical and electronics engineers (IEEE) 802.11n/b/g and is capable of conducting network connection with the external device in a wired or a wireless manner for retrieving data.

The storage unit 14 may be any type of a fixed or movable random access memory (RAM), a read-only memory (ROM), a flash memory or a similar device or a combination of the aforementioned devices. In the present embodiment, the storage unit 14 is configured to record data retrieved by the data retrieving unit 12, wherein the data includes data related to at least one indoor space which is obtained or generated by a method for establishing a coordinate system and computer commands or programs which may be accessed and executed by the processor 16.

The processor 16 is, for example, a central processing unit (CPU) or a graphics processing unit (GPU), or other programmable general purpose or special purpose microprocessors, digital signal processors (DSP), programmable controllers, application specific integrated circuits (ASIC), programmable logic devices (PLD) or other similar devices or a combination of the above devices. The processor 16 is connected with the data retrieving unit 12 and the storage unit 14 and is configured to load computer commands or programs from the storage unit 14 to perform a method for establishing a coordinate system introduced by the disclosure. Embodiments are provided below for describing detailed steps of the method.

Figure 2:
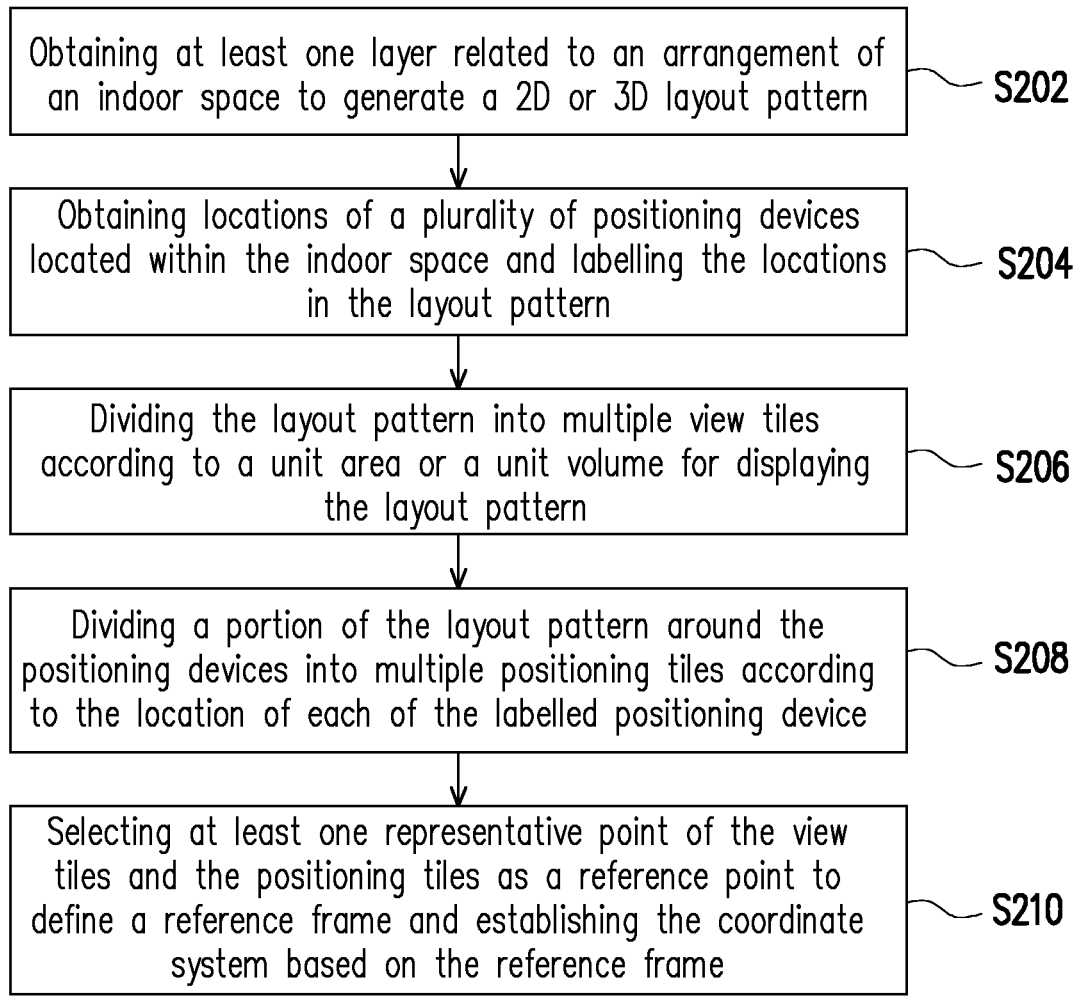
FIG. 2 is a flowchart illustrating a method for establishing a coordinate system according to an embodiment of the disclosure.
Figure 3A:
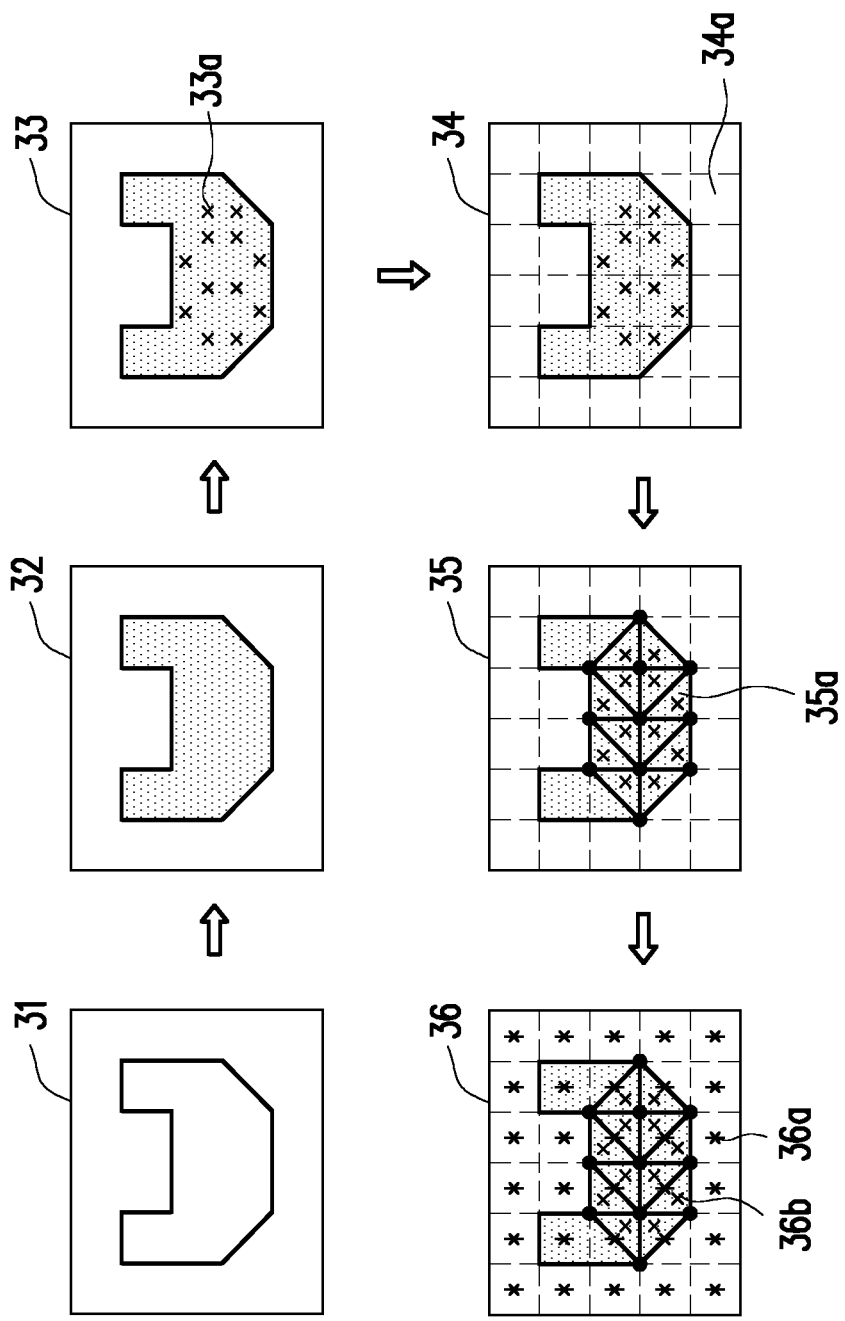
FIG. 3A and FIG. 3B illustrate an example of a method for establishing a coordinate system according to an embodiment of the disclosure.
Figure 3B:
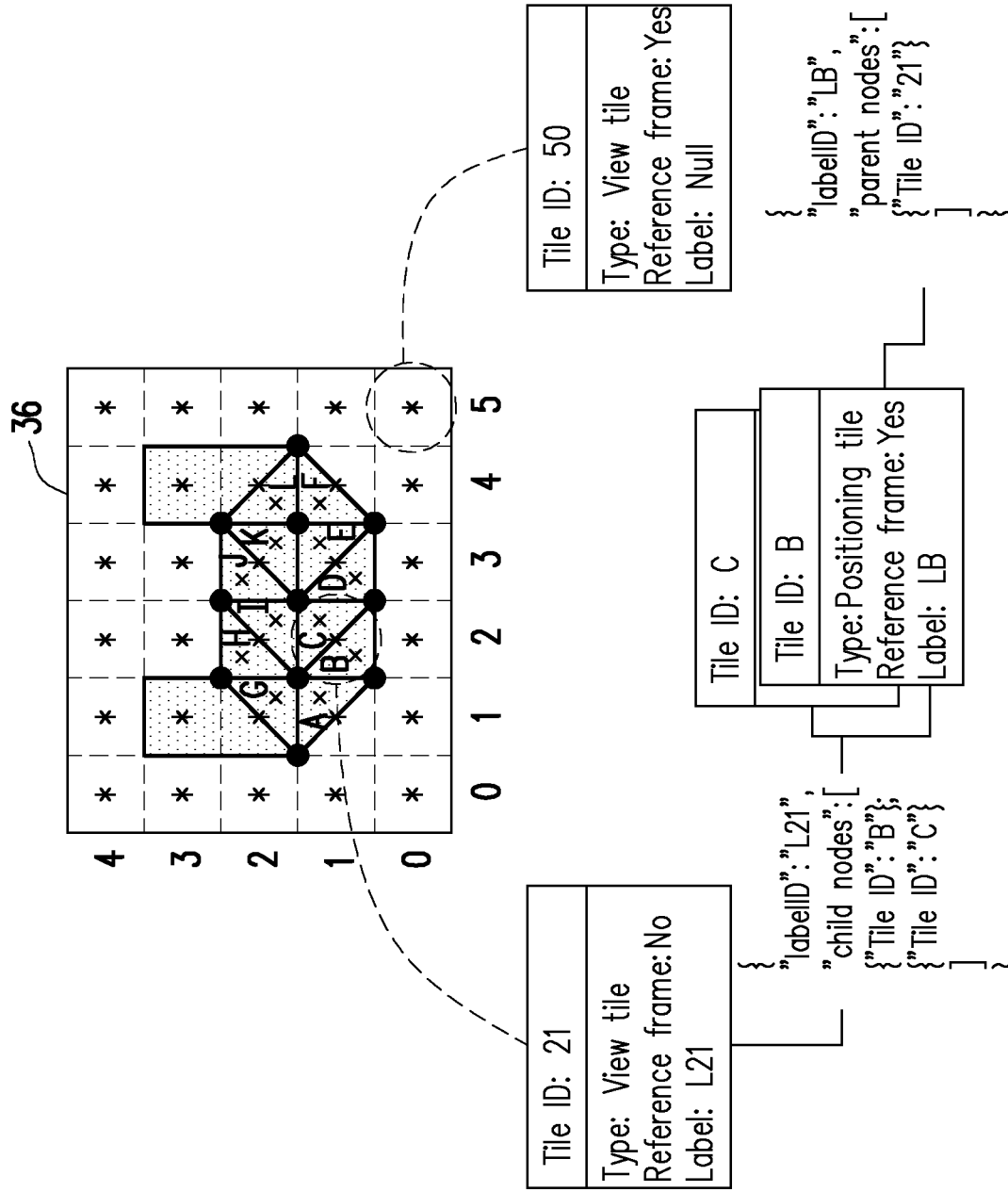

FIG. 2 is a flowchart illustrating a method for establishing a coordinate system according to an embodiment of the disclosure. FIG. 3A and FIG. 3B illustrate an example of a method for establishing a coordinate system according to an embodiment of the disclosure. With reference to FIG. 1, FIG. 2 and FIG. 3A simultaneously, the method of the present embodiment is applicable to the coordinate system establishing apparatus 10 illustrated in FIG. 1, and detailed steps of the method for establishing the coordinate system of the disclosure are described below in cooperation with the coordinate system establishing apparatus 10.

In step S202, the processor 16 obtains at least one layer related to an arrangement of an indoor space through the data retrieving unit 12 or the storage unit 14 to generate a layout pattern in a two-dimensional (2D) or a three-dimensional (3D) model, and in an embodiment further displays the layout pattern in an editing interface. The aforementioned layer includes, for example, a graph or a map on which a contour of the indoor space is illustrated, a 3D model of the indoor space, an object arrangement layout or an equipment arrangement labelling the objects within the indoor space, which is not limited herein. In the example illustrated in FIG. 3A, a contour 31 and a map or an arrangement view 32 of an indoor space are obtained and the obtained layers are overlaid or merged to generate a layout pattern 33 in 2D or 3D model.

In step S204, locations of a plurality of positioning devices located within the indoor space are obtained by the data retrieving unit 12 and labelled in the layout pattern (for example, a mark 33a labelled in the layout pattern 33 in FIG. 3A). In an embodiment, the aforementioned operation is performed by an editing interface. The positioning devices include various types of light sources (e.g., lighting systems, display backlights, signal lamps and lightbox billboards) supporting visible light communication and are configured to emit visible light waves with wavelengths ranging between 380 nm and 780 nm for a user device to retrieving light signals so as to demodulate and perform positioning according to decoding results. The specific implementation embodiments may refer to the Applicant's previously filed patent application (i.e., Taiwan application no. 106126391), but the disclosure is not limited thereto. In an embodiment, the processor 16 may receive locations of positioning devices provided by an external device with the data retrieving unit 12, for example, locations of positioning devices which are input in the editing interface by the user using a keyboard, a mouse or other devices, so as to label the locations in the layout pattern, but the present embodiment is not limited thereto.

In step S206, the processor 16 divides the layout pattern into multiple view tiles (for example, view tiles 34a obtained by dividing with dashed lines in a layout pattern 34 illustrated in FIG. 3A) according to a unit area or a unit volume used for displaying the layout pattern. Specifically, the view tiles of the layout pattern may be, for example, one or more geometric patterns capable of covering the overall indoor space, wherein a minimum view tile of the layout pattern has a size, for example, equal to the unit area or the unit volume. In an embodiment, the size of the view tiles of the layout pattern may also be determined based on a bandwidth for transmitting or receiving tile data and a resolution for displaying the layout pattern used by the user device, but the present embodiment is not limited thereto.

In step S208, the processor 16 divides a portion of the layout pattern around the positioning devices into multiple positioning tiles (for example, positioning tiles 35a obtained by dividing with connection lines between dots in a layout pattern 35 illustrated in FIG. 3A, and each positioning tile covers a positioning device) according to the labelled location of each of the positioning devices. In an embodiment, the processor 16 clusters data points in the layout pattern by using, for example, a minimum spanning tree or K-means algorithm. The data points are, for example, intersection points on unit grid lines in the layout pattern, and the unit may be a centimeter (cm), a meter (m), a millimeter (mm), a square feet, or a pixel, which is not limited herein.

In an embodiment, the processor 16 uses, for example, a graph constructed by multiple vertices and multiple edges connecting the vertices to represent a relation between each data point and each positioning device. Specifically, the vertexes are a set of locations of each data point and each positioning device, and any different vertices within the set have edges connecting with each other, thereby forming a complete graph. A signal intensity is obtained according to the labelled location of each of the positioning devices and transformed into a weight value of an edge connecting a data point and a positioning device, while a weight value of another edge connecting two data points and a weight value of another edge connecting two positioning devices are both set to infinity. By defining an optimization goal through the transformation, the vertices are clustered into a specific number of subsets, such that a total weight value of the edges with minimum weight values between the subsets is the greatest, wherein a Kruskal's algorithm for generating a minimum spanning tree in the related art may be applied to solve the optimization problem.

In another embodiment, the processor 16 may, for example, define the optimization goal as clustering the data points of the layout pattern by serving the location of each of the positioning devices as a cluster center such that an error between all the data points and the cluster center thereof is minimized, thereby dividing the portion of the layout pattern into the positioning tiles according to a coverage range of the data points of each cluster. Therein, the error may be a sum of distances (e.g., Euclidean distances) from the data points of each cluster to the cluster center thereof, and the conventional K-means clustering algorithm may be applied to solve the optimization problem. The manners of expressing and transforming the optimization problem and the adopted clustering algorithm are not particularly limited in the disclosure.

Figure 4:
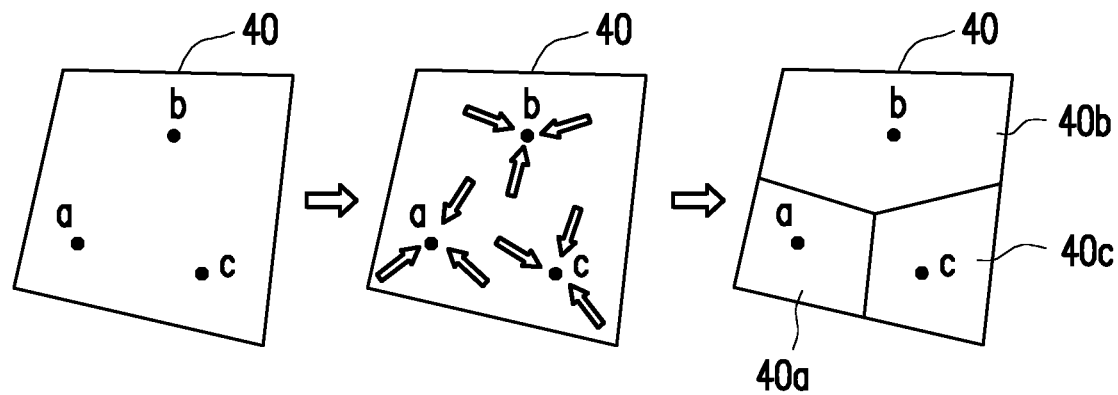
FIG. 4 illustrates an example of dividing a layout pattern into positioning tiles according to an embodiment of the disclosure.

For instance, FIG. 4 illustrates an example of dividing a layout pattern into positioning tiles according to an embodiment of the disclosure. With reference to FIG. 4, if it is assumed that there are 3 positioning devices a, b and c labelled in a layout pattern 40 to be divided, a plurality of data points of the layout pattern 40 are clustered by serving locations of the 3 positioning devices a, b and c as cluster centers to minimize an error between all the data points of each cluster and the cluster center thereof, thereby dividing the layout pattern 40 into positioning tiles 40a, 40b and 40c according to a range of the data points of each cluster.

In an embodiment, besides according to the labelled location of each positioning device in the layout pattern, the processor 16 further divides the portion of the layout pattern around the positioning devices into multiple positioning tiles according to borders of the view tiles around the locations of the positioning devices, such that each of the obtained positioning tile is only located within a range of a single one of the view tiles. Namely, each positioning tile merely corresponds to one view tile. In this way, when the user device is subsequently positioned, only by referring to a positioning device nearest to the user device, a corresponding view tile may be obtained according to a positioning tile where the positioning device is located and displayed on the user device. For example, in the example illustrated in FIG. 3A, the layout pattern 35 is divided into the positioning tiles 35a by the connection lines between the intersection points (i.e., the dots) located on unit grid lines (which may be considered as the borders of the view tiles) in the layout pattern 35, and thus, each of the positioning tiles 35a corresponds to only one view tile.

Returning to the process illustrated in FIG. 2, in step S210, the processor 16 selects at least one representative point in the view tiles and the positioning tiles which are obtained by the dividing above as a reference point to define a reference frame, thereby establishing a coordinate system based on the reference frame. Specifically, the processor 16, for example, selects a set of the positioning tiles and a portion of the view tiles as reference tiles which are capable of covering the indoor space and defines the reference frame by using the representative point of each reference tile, thereby establishing the coordinate system based on the reference frame. The aforementioned representative point is, for example, a geometric center of the corresponding view tile or positioning tile, which is not limited in the present embodiment. Taking FIG. 3A as an example, in a layout pattern 36, a representative point of each view tile 36a is labelled by "*", and a representative point of each positioning tile 36b is labelled by "x".

With the coordinate system established by the aforedescribed method, any point in the indoor space may be expressed by an identification (ID) of a reference tile in combination with an expression of the coordinate system. To be specific, for any one of the at least one target point in the indoor space, a coordinate of the target point in the established coordinate system may be expressed by the ID of the reference point with the shortest distance from the target point in the reference frame and a distance and with an orientation of the target point with respect to the reference point.

Figure 5A:
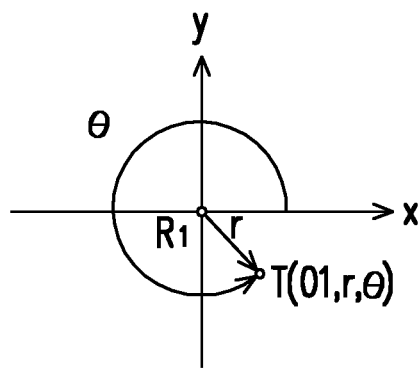
FIG. 5A and FIG. 5B respectively illustrate examples of labelling an arbitrary target point in an indoor space according to an embodiment of the disclosure.
Figure 5B:
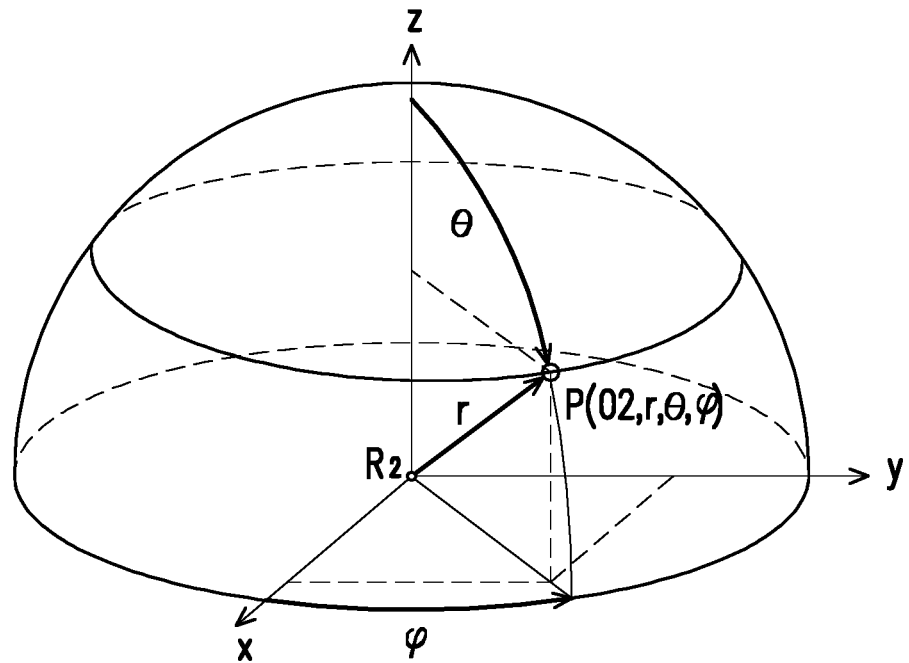

For instance, FIG. 5A and FIG. 5B respectively illustrate examples of labelling an arbitrary target point in an indoor space according to an embodiment of the disclosure. With reference to FIG. 5A, taking the layout pattern in a 2D model as an example, a polar coordinate system may be used to express a location of a target point T in a 2D space. In this expressing method, a point closet to the target point T on a reference frame serves as a reference point $R_1$ (which is a representative point of the reference tile), and a location of the target point T in the indoor space is expressed by an ID, 01, of the reference tile which the reference point $R_1$ belongs to, a distance r between the target point T and the reference point $R_1$ and an included angle θ with respect to a polar axis x, i.e., T(01, r, θ).

With reference to FIG. 5B, taking the layout pattern in a 3D model as an example, a spherical coordinate system may be used to express a location of a target point P in a 3D space. In this expressing method, a point closet to the target point P on a reference frame serves as a reference point $R_2$ (which is a representative point of the reference tile), and a location of the target point P in the indoor space is expressed by an ID, 02, of the reference tile which the reference point $R_2$ belongs to, a distance r between the target point P and the reference point $R_2$, an included angle θ between a connection line from the reference point $R_2$ to the target point P and a positive z axis and an included angle φ between a projection line of a connection line from the reference point $R_2$ to the target point P on an xy plane and a positive x axis, i.e., P(02, r, θ, φ).

In an embodiment, the view tiles generated by dividing the layout pattern may serve to establish a data structure for representing data related to the indoor space, which includes a first field (i.e., an ID field) for storing an ID of one of the multiple tiles obtained by dividing in at least one indoor space by the method for establishing the coordinate system, a second field (i.e., a data type field) for storing a type for defining the tile which includes a view tile type and a positioning tile type, a third field (i.e., a reference mark field) for making whether at least one representative point of the tile is a reference point and a fourth field (i.e., a note field) for storing information related to the tile, where the information includes, but is not limited to, a hierarchical relationship of the data structure such as an ID of a father node or a child node, an attribute of the view tile such as a floor or a zoom level, or object description such as an expression of point, line, plane, or body, a coordinate, or an attribute of the object.

Taking FIG. 3B as an example, the layout pattern 36 includes multiple view tiles and multiple positioning tiles, while in the data structure established according to the embodiment of the disclosure, a file is recorded for each of the view tiles, where the file includes an ID, a data type and a note. The view tiles in the layout pattern 36 are numbered from 0 to 5 from left to right in the horizontal direction and numbered from 0 to 4 from top to bottom in the vertical direction, such that the ID of each view tile may be expressed by a location (including the number in the horizontal direction and the number in the vertical direction) where the view tile is located. For example, the view tile which is numbered by 2 in the horizontal direction and numbered by 1 in the vertical direction has an ID of 21, and the view tile which is numbered by 5 in the horizontal direction and numbered by 0 in the vertical direction has an ID of 50. Additionally, in the data structure, the types of the view tiles 21 and 50 which are view tiles, whether the view tiles 21 and 50 serve as reference frames (yes) and the notes (where the note of the view tile 21 is L21, and the note of the view tile 50 is LB) are recorded. The aforementioned notes are configured to retrieve data from a database for use, for example, the note L21 indicates to retrieve data with "labelID" of "L21" from the database, as illustrated in FIG. 3B. On the other hand, according to FIG. 3B, the view tile 21 includes the positioning tiles whose representative points are B and C respectively. Thus, in the data structure, the IDs which are B and C, the types which are positioning tiles, whether serving as reference frames (yes) and the notes of the two positioning tiles (for example, the note of the positioning tile B is LB, which indicates to retrieve data with "labelID" of "LB" from the database, as illustrated in FIG. 3B) are respectively recorded, and based on the fact the positioning tiles B and C are included in the view tile 21, the view tile related to the positioning tiles B and C is also recorded in the data structure as the view tile 21 (the relation is expressed by a connection line in FIG. 3B).

In an embodiment of the disclosure, a server (i.e., the coordinate system establishing apparatus) serves to record the data related to at least one indoor space, and a management program of the disclosure is provided for an external user device to query and obtain map information about the location thereof. When being located in the indoor space, the user may use the user device to perform positioning using the positioning devices supporting the visible light communication, read IDs of the surrounding positioning devices to calculate the user's location and upload a coordinate of the location to the server based on the established coordinate system. When receiving the user's location obtained by the user device performing positioning using the positioning devices, the server (which includes an execution module) obtains the view tile near the user's location according to contents of the fields (for example, the ID of the view tile or the ID of the father node or child node in the note field) of a corresponding reference tile and output the view tile to the user device, thereby providing map information near the location of the user device. The user device may then detect the user's movement and direction by using an inertial element such as a gravity sensor or a gyroscope in the device and calculate a travelling distance by serving the location as a reference point. When predicting that the vicinity of another positioning device is reached, the user device performing positioning again so as to re-calibrate the reference point. In this way, the user device not only can accurately predict the location of the user in the indoor space, but also can obtain an indoor map around the location from the server.

Figure 6A:
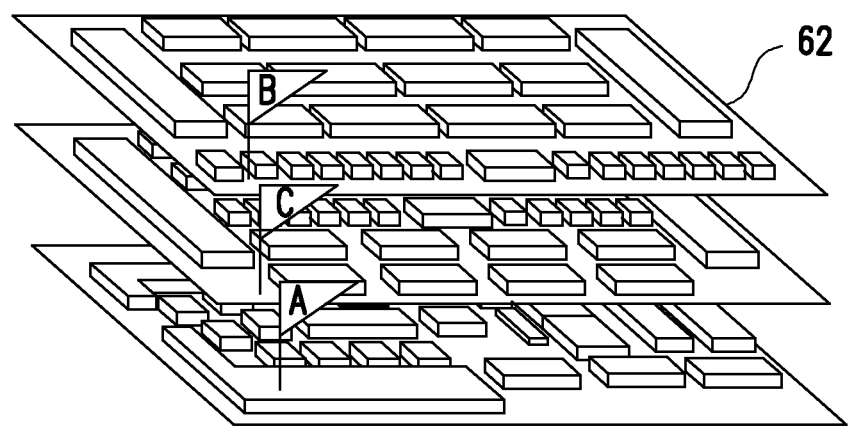
FIG. 6A and FIG. 6B illustrate an example of a method of using a coordinate system according to an embodiment of the disclosure.
Figure 6B:
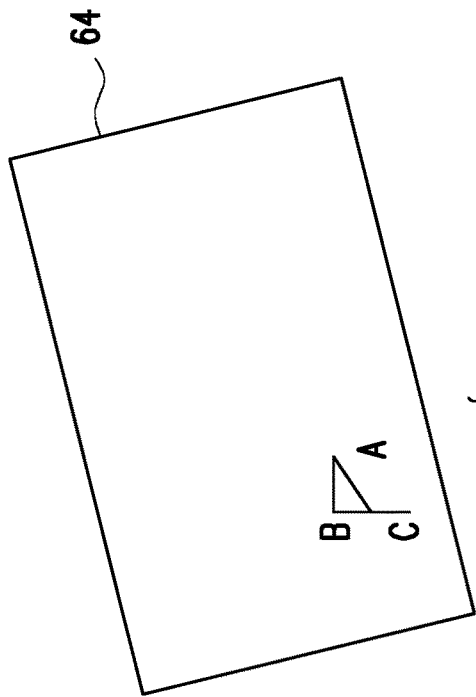

Based on the coordinate system established by the embodiments described above, any point of interest (POI) in the indoor space may be assigned with an absolute coordinate. For instance, the 3 POIs in an indoor space illustrated in FIG. 6A are overlapped as one point if being viewed in a top view (as shown in FIG. 6B), nevertheless, in the embodiments of the disclosure, layout patterns of different floors are separated, such that the 3 POIs respectively belongs to different reference tiles and each POI is assigned with an absolute coordinate according to an ID of a reference point and a distance and an orientation of the POI with respect to the reference point. In a data structure, the IDs which are A, B and C, the types which are view tiles, whether serving as a reference frame (no) and the notes (the note of the view tile A is LA, the note of the view tile B is LB, and the note of the view tile C is LC) of the view tiles where the POIs A, B and C belongs are respectively recorded. The notes are configured to retrieve data from a database for use. For example, the note LA indicates to retrieve data with "labelID" of "LA" as illustrated in FIG. 6B, which includes data such as an attribute, child vertexes included therein, a name, a location (orientation), a mother vertex thereof. By deriving in the same way, the note LB indicates to retrieve data with "labelID" of "LB" as illustrated in FIG. 6B, and the note LC indicates to retrieve data with "labelID" of "LC" as illustrated in FIG. 6B. With reference to FIG. 6A, the note fields of the view tiles which the POIs A, B and C belong to respectively record data of information related to the POIs A, B and C, including floors, names and coordinates of the POIs. In an application of an electronic map, when a user searches for a POI, nearby view tiles may be sent to display the electronic map on the user terminal, and in an application of indoor navigation, when a user sets a POI as a start point, a destination point or a passing point of a path, the path may be planned with the coordinate of the POI.

Figure 7A:
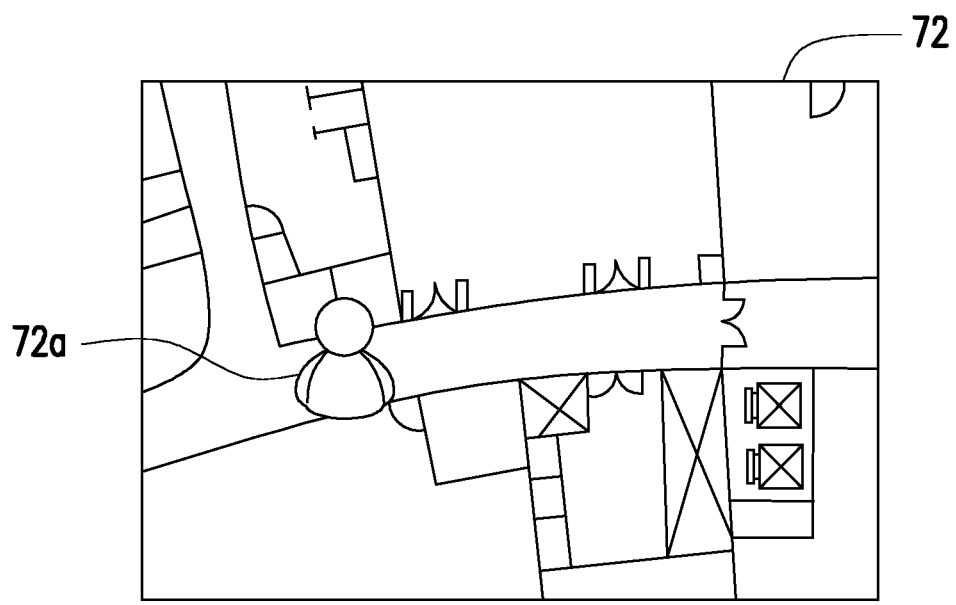
FIG. 7A to FIG. 7C illustrate an example of a method of using a coordinate system according to an embodiment of the disclosure.
Figure 7B:
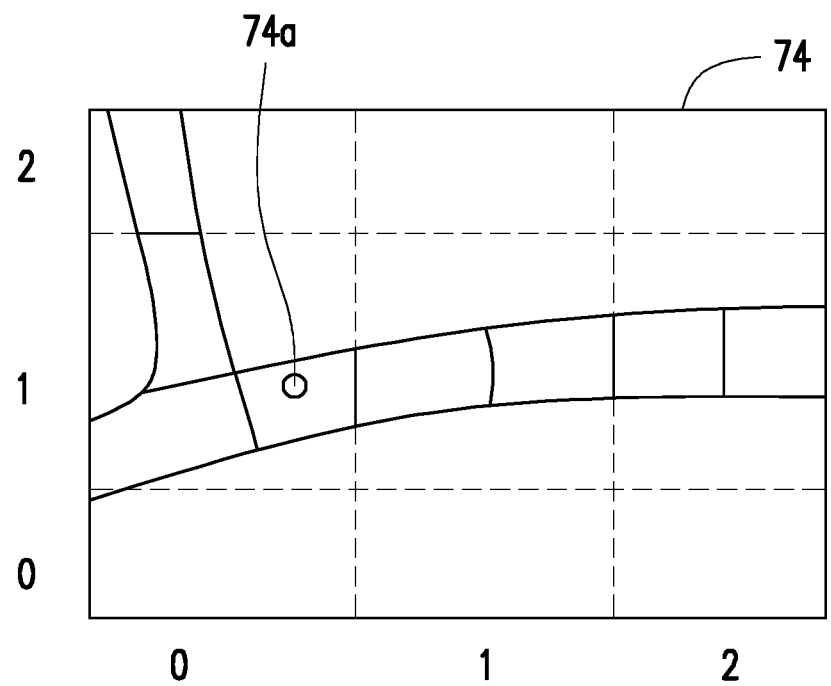
Figure 7C:
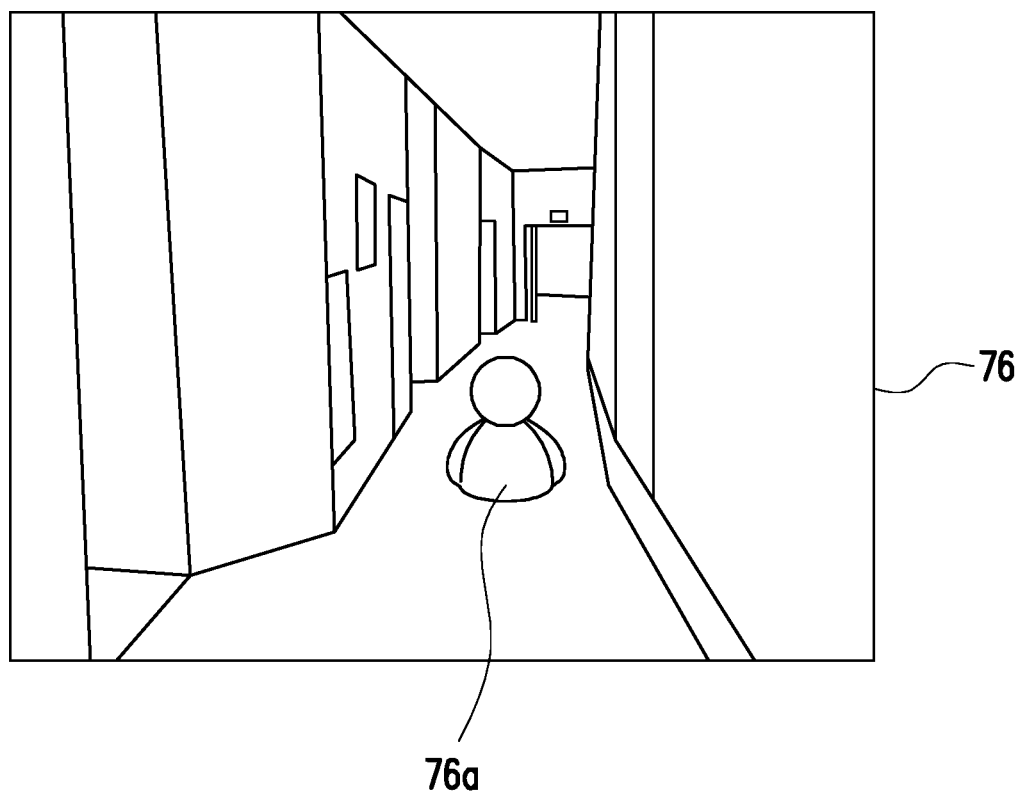

In an embodiment, the coordinate system may be applied to augmented reality (AR) experience. For instance, FIG. 7A to FIG. 7C illustrate an example of a method of using a coordinate system according to an embodiment of the disclosure. A system vendor may establish an AR object 72a in an indoor layout pattern 72 as illustrated in FIG. 7A, where an anchor point 74a of the object is as illustrated in FIG. 7B, and description (e.g., a geometric expression, a coordinate and an attribute) related to the object is recorded in a note field of a father node (i.e., a view tile of the layout pattern) of the positioning tile where the object belongs, such that when the user moves in the indoor space, a distance between the AR object and the user may be calculated based on the coordinates of the locations of the AR object and the user, and the AR object may be simultaneously obtained while the user device accesses a nearby view tile. In this way, the user may view the AR object 76a in an AR scene 76 displayed in a display unit of the user device.

In light of the foregoing, the method and the apparatus for establishing a coordinate system and the data structure product introduced by the disclosure can use the existing lighting devices as the positioning devices, could without measuring the received signal strength indicator (RSSI) and processing the location fingerprint at each sampling point. In addition, a data structure of the electronic map and the locations of the positioning devices are integrated to define an absolute coordinate system in the disclosure, such that each point in the indoor space can be accurately represented, and this coordinate system could not be influenced by changes in the arrangement.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for establishing a coordinate system of an indoor space by an electronic apparatus, comprising:
obtaining at least one layer related to an arrangement of the indoor space to generate a layout pattern in a two-dimensional (2D) or a three-dimensional (3D) model;
obtaining locations of a plurality of positioning devices located within the indoor space and labelling the locations in the layout pattern;
determining a size of a unit area or a unit volume according to at least one of a bandwidth for transmitting the layout pattern and a resolution for displaying the layout pattern;
dividing the layout pattern into a plurality of view tiles according to the unit area or the unit volume for displaying the layout pattern, wherein dividing the layout pattern into the plurality of view tiles is unrelated to the locations of the plurality of positioning devices;
dividing a portion of the layout pattern around the positioning devices into a plurality of positioning tiles according to the labelled location of each of the positioning devices, wherein each of the positioning tiles covers one of the positioning devices and is located within one of the view tiles;
selecting a set of the positioning tiles and a portion of the view tiles as reference tiles capable of covering the indoor space, and selecting at least one representative point of each of the reference tiles as a reference point to define a reference frame and establishing the coordinate system based on the reference frame; and
defining a location of any one of at least one target point in the indoor space with reference to the reference frame, which comprises:
obtaining the reference point with a shortest distance from the target point in the reference frame;
calculating a distance and an orientation of the target point with respect to the reference point; and
serving the ID number of the reference point, the distance and the orientation as a coordinate of the target point in the coordinate system.

2. The method according to claim 1, wherein the step of dividing the portion of the layout pattern around the positioning devices into the plurality of positioning tiles according to the labelled location of each of the positioning devices comprises:
clustering a plurality of data points of the layout pattern by serving the location of each of the positioning devices as a cluster center, such that an error between all the data points in each cluster and the cluster center of the cluster is minimized and dividing the layout pattern into the positioning tiles according to a range of the data points of each cluster.

3. The method according to claim 2, wherein the data points comprise intersection points on unit grid lines in the layout pattern, and the error is a sum of distances from the data points in each cluster to the cluster center of the cluster.

4. The method according to claim 1, wherein the step of dividing the portion of the layout pattern around the positioning devices into the plurality of positioning tiles according to the labelled location of each of the positioning devices further comprises:
dividing the portion of the layout pattern around the positioning devices into the plurality of positioning tiles according to borders of the view tiles around the location of each of the positioning devices, such that the positioning tiles divided from the layout pattern are only located within a range of a single one of the view tiles.

5. The method according to claim 1, wherein the step of selecting the at least one representative point of each of the reference tiles as the reference point to define the reference frame and establishing the coordinate system based on the reference frame further comprises:
defining a data structure capable of expressing the indoor space by using tiles, wherein the data structure comprises at least one of an ID number, a data type and a note field of each of the tiles.

6. The method according to claim 5, further comprising:
receiving a user's location obtained by a user device using the positioning devices for positioning; and
transmitting the view tiles near the user's location to the user device for display on the user device.

7. The method according to claim 1, wherein the representative point is a geometric center of the corresponding view tiles or positioning tiles.

8. An apparatus for establishing a coordinate system, comprising:
a data retrieving unit;
a storage unit, storing data retrieved by the data retrieving unit and a plurality of computer commands or programs; and
a processor, coupled to the data retrieving unit and the storage unit and configured to execute the computer commands or the programs to:
obtain, by the data retrieving unit or the storage unit, at least one layer related to an arrangement of an indoor space to generate a layout pattern in a 2D or 3D model;
obtain, by the data retrieving unit, locations of a plurality of positioning devices located within the indoor space and label the locations in the layout pattern;
determine a size of a unit area or a unit volume according to at least one of a bandwidth for transmitting the layout pattern and a resolution for displaying the layout pattern;
divide the layout pattern into a plurality of view tiles according to the unit area or the unit volume for displaying the layout pattern, wherein dividing the layout pattern into the plurality of view tiles is unrelated to the locations of the plurality of positioning devices;
divide a portion of the layout pattern around the positioning devices into a plurality of positioning tiles according to the labelled location of each of the positioning devices, wherein each of the positioning tiles covers one of the positioning devices and is located within one of the view tiles;
select a set of the positioning tiles and a portion of the view tiles as reference tiles capable of covering the indoor space, and selecting at least one representative point of each of the reference tiles as a reference point to define a reference frame and establish the coordinate system based on the reference frame; and
define a location of any one of at least one target point in the indoor space with reference to the reference frame, which comprises:
obtaining the reference point with a shortest distance from the target point in the reference frame;
calculating a distance and an orientation of the target point with respect to the reference point; and
serving the ID number of the reference point, the distance and the orientation as a coordinate of the target point in the coordinate system.

9. The apparatus according to claim 8, wherein the processor comprises clustering a plurality of data points of the layout pattern by serving the location of each of the positioning devices as a cluster center, such that an error between all the data points in each cluster and the cluster center of the cluster is minimized and dividing the layout pattern into the positioning tiles according to a range of the data points of each cluster.

10. The apparatus according to claim 9, wherein the data points comprise intersection points on unit grid lines in the layout pattern, and the error is a sum of distances from the data points in each cluster to the cluster center of the cluster.

11. The apparatus according to claim 9, wherein the processor further divides the portion of the layout pattern around the positioning devices into the plurality of positioning tiles according to borders of the view tiles around the location of each of the positioning devices, such that the positioning tiles divided from the layout pattern are only located within a range of a single one of the view tiles.

12. The apparatus according to claim 8, wherein the processor further defines a data structure capable of expressing the indoor space by using tiles, wherein the data structure comprises at least one of an ID number, a data type and a note field of each of the tiles.

13. The apparatus according to claim 12, wherein the processor further receives a user's location obtained by a user device using the positioning devices for positioning by using the data retrieving unit and transmits the view tiles near the user's location to the user device for display on the user device.

14. A non-transitory storage medium storing
a data structure comprising:
a first field, storing an ID number of one of a plurality of tiles divided from an indoor space, wherein the tiles comprises view tiles and positioning tiles;
a second field, storing a type of the one of the tiles;
a third field, storing a mark indicating whether at least one representative point of the one of the tiles is a reference point; and
a fourth field, storing information related to the one of the tiles, wherein the information comprises at least one of a hierarchical relationship of the data structure, an attribute of the tile or object description, wherein
the view tiles are obtained by dividing a layout pattern according to a unit area or a unit volume for displaying the layout pattern generated by at least one layer related to an arrangement of the indoor space, wherein a size of the unit area or the unit volume is determined according to at least one of a bandwidth for transmitting the layout pattern and a resolution for displaying the layout pattern, and obtaining the view tiles by dividing the layout pattern is unrelated to locations of the plurality of positioning devices; and
the positioning tiles are obtained by dividing a portion of the layout pattern around a plurality of positioning devices according to the location of each of the positioning devices labelled in the layout pattern, wherein each of the positioning tiles covers one of the positioning devices and is located within one of the view tiles,
wherein a set of the positioning tiles and a portion of the view tiles are selected as reference tiles capable of covering the indoor space and at least one representative point of each of the reference tiles is selected as the reference point to define a reference frame and establish a coordinate system based on the reference frame, and
wherein a location of any one of at least one target point in the indoor space is defined by obtaining the reference point with a shortest distance from the target point in the reference frame, calculating a distance and an orientation of the target point with respect to the reference point, and serving the ID number of the reference point, the distance and the orientation as a coordinate of the target point in the coordinate system; and an execution module, accessing the data structure through a processor and determining and outputting the view tiles near the location according to contents of the fields corresponding to the location.

\* \* \* \* \*